Figure 1:
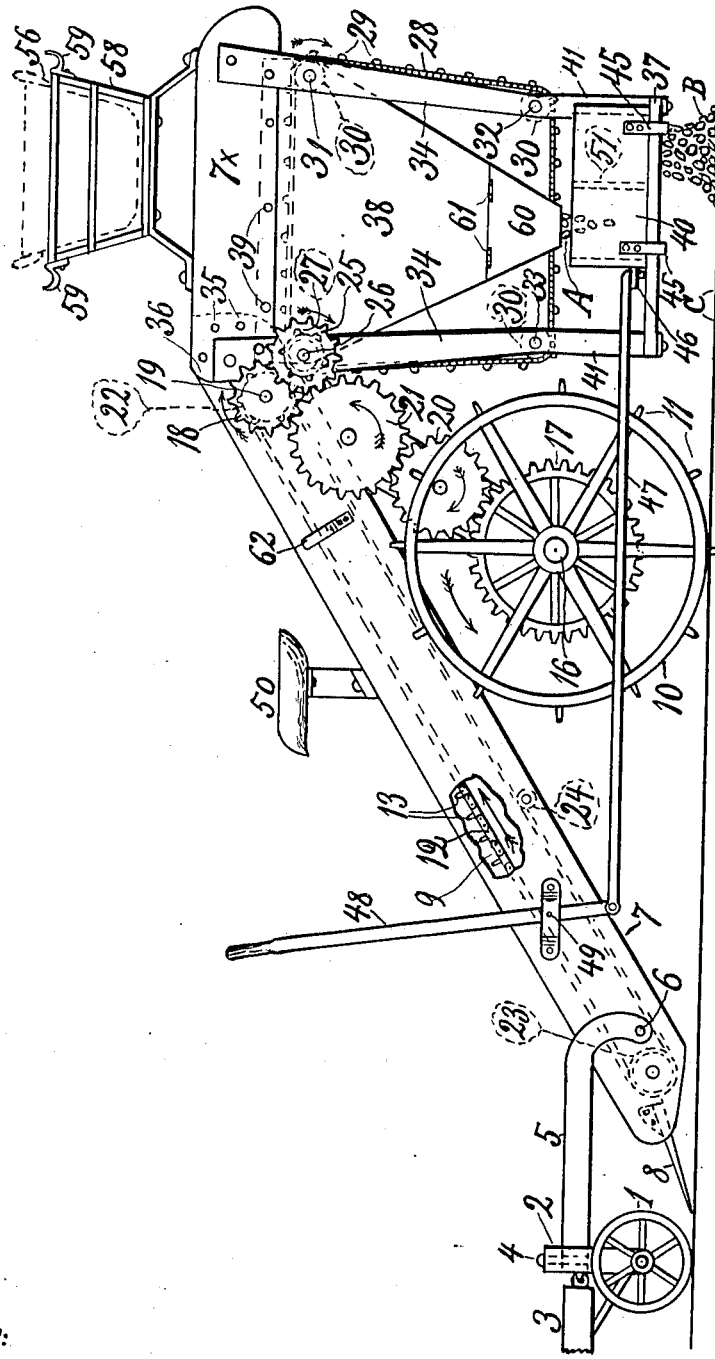

G. W. BRUCE.
POTATO HARVESTER.
APPLICATION FILED DEC. 11, 1909.

1,019,752.

Patented Mar. 12, 1912.
2 SHEETS—SHEET 1.

WITNESSES:
M. M. Carlsen.
A. E. Carlsen.

INVENTOR:
George W. Bruce.
BY his ATTORNEY:
A. M. Carlsen.

COLUMBIA PLANOGRAPH CO., WASHINGTON, D. C.

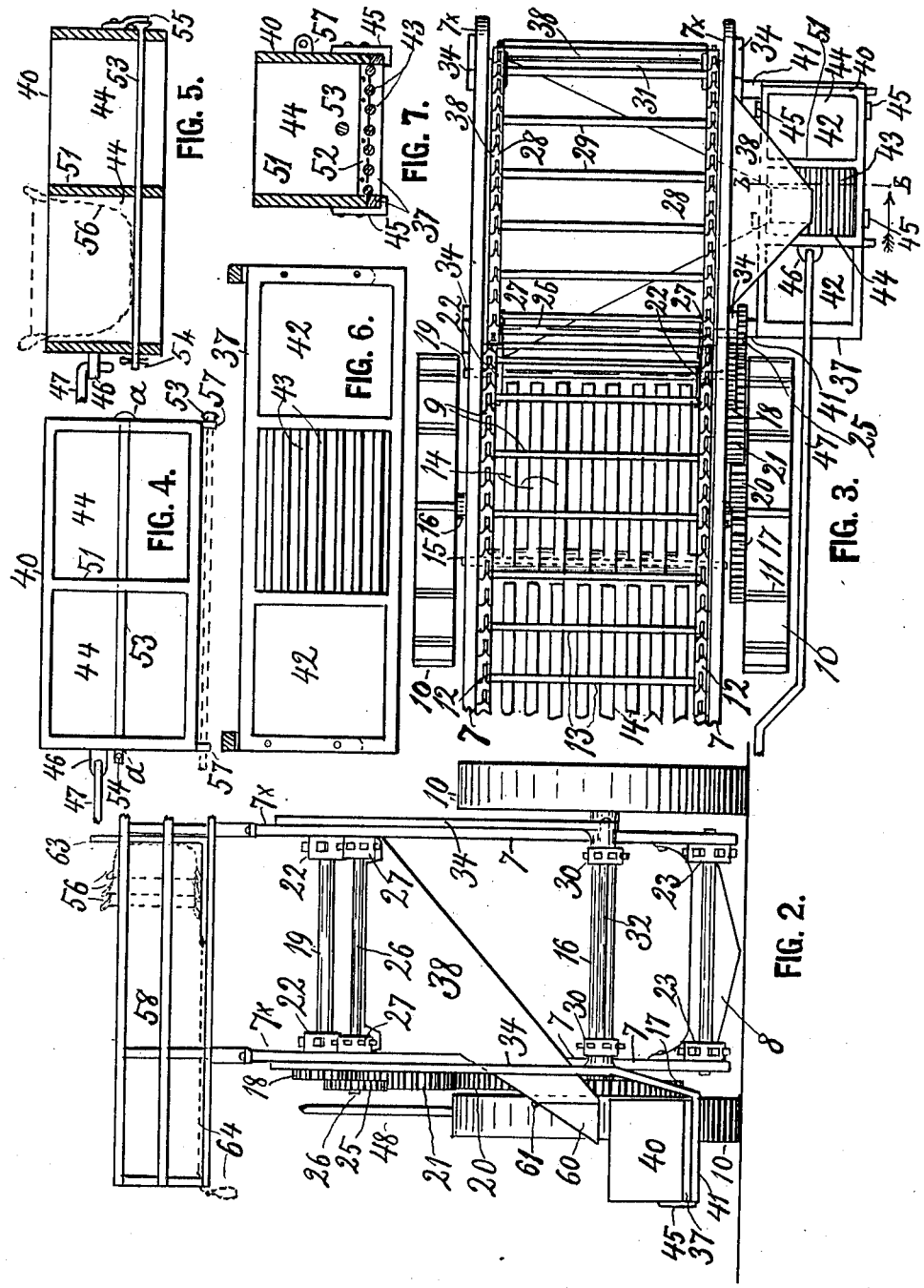

UNITED STATES PATENT OFFICE.

GEORGE W. BRUCE, OF LARIMORE, NORTH DAKOTA.

POTATO-HARVESTER.

1,019,752. Specification of Letters Patent. Patented Mar. 12, 1912.

Application filed December 11, 1909. Serial No. 532,611.

*To all whom it may concern:*

Be it known that I, GEORGE W. BRUCE, a citizen of the United States, residing at Larimore, in the county of Grand Forks and State of North Dakota, have invented a new and useful Potato-Harvester, of which the following is a specification.

My invention relates to potato harvesters; and the main object is to provide a machine which will dig the potatoes, separate them from the dirt and vines, and deposit them into rows of heaps on the field in convenient order to be shoveled into the wagon; or if so desired the heaps may be deposited in baskets ready to be emptied into the wagon without shoveling.

My improvement may also be applied as an attachment to potato harvesters of almost any type.

In the accompanying drawing,—Figure 1 is a side elevation of a potato harvester embodying my invention. Fig. 2 is a rear end elevation of the machine in Fig. 1, with all conveyer belts or aprons omitted. Fig. 3 is plan view of the rear half of the machine in Fig. 1 with the basket carrying rack on the top of the frame and the hinges 61 at the side of the hopper omitted. Fig. 4 is a detail plan view of the box from which the potatoes are discharged in heaps on the ground, with a supporting rod in it for baskets. Fig. 5 is a section on line $a$—$a$ in Fig. 4 with a catch added. Fig. 6 is a plan view of the base upon which the box in Fig. 4 is fitted to slide. Fig. 7 is a cross section on line $b$—$b$ in Fig. 3 of the discharging box and its base.

Referring to the drawings by reference numerals, 1 designates the steering wheels, having their axle 2 provided with a draft pole 3 and swinging horizontally on a ringbolt 4 in a large draft clevis 5, the latter having its rear ends attached at 6 to the front end of the inclined main frame 7 of the potato digger or harvester. The latter may be of any of the types drawn by horses or other power, and having at the front end a shovel 8, and rearward thereof an endless carrier 9, operatively connected with one or both of the supporting wheels 10, which are therefore provided with cleats 11, as shown in Figs. 1 and 3. Said endless carrier is in some machines made up of light bars placed transversely to the movement of the carrier and attached together so closely that only the dirt but not the potatoes can pass down between them; while in other machines the carrier is as in my drawing, made up of two endless chains or link-belts 12 and bars 13 secured with their ends to the chains, and are spaced far enough apart for any potatoes to drop between them, but close below the upper run of the carrier is a skeleton bottom made up of vertically vibrating bars 14, arranged in sets, of which the rear set and part of the next set are shown in Fig. 3 where it will be understood that each set has the front ends of the bars pivoted on a rod like 15, and the rear ends vibrated by a multiple crank shaft or cam shaft (not shown), so that the dirt is worked downward between said bars 14 while the potatoes are moved by the bars 13 upward and rearward until discharged from the rear end of the carrier.

The arrangements so far described and which allude to two forms of diggers as representing the main principles of several others forms, I do not claim as my inventions, but have merely had to point to them in order to be able to clearly explain the adaptability of my invention to any and all of them.

The operative connection I have shown with one of the driving wheels 10, or both of them by means of the axle 16, is a gear wheel 17, secured on the axle 16, or to one of the driving wheels, and operatively geared to a cog wheel 18, by means of idlers 20 and 21. Said gear 18 is fixed on one end of a shaft 19, on which are fixed two sprockets 22, which engage and operate the rear loop of the carrier while front wheels 23 engage the front loop, and intermediate rollers 24 support the slack lower run of the carrier. The face of the idler 21 is wide enough to mesh not only with gear 18 but also with a gear 25; the latter gear is fixed on one end of a shaft 26, on which are fixed two sprockets 27 (best shown in Fig. 2), which sprockets operate an endless carrier made up of two endless link belts 28 and bars 29 secured with their ends thereto; said carrier is stretched over said operating sprockets 27 and over loose guiding wheels 30, mounted on shafts 31, 32, 33, which, as well as shaft 26, are mounted in four hangers 34, depending from the rear portions $7^x$ of the side boards 7 of the main frame. Said rear portions $7^x$ may in case of existing machines have to be furnished as the frame of my attachment and are then bolted to the frame 7, as at 35 in Fig. 1, where the front end of the board 7ˣ is indicated at 36, so that the frame made up of boards 7ˣ, shafts or bars 31, 32, 33, hangers 34, frame 37 and a hopper or chute 38 may be attached by bolts 35 to any ordinary potato harvester.

To the frame portion 7ˣ is secured at 39 the upper end of the hopper 38, which is thus suspended below the upper run of the rear carrier 28—29, and extends downward therefrom between the four runs of the carrier, and laterally out therefrom at one side of the machine, where its small end or spout overhangs a box 40, which has two bottomless compartments 44, and is mounted upon said flat frame 37 and provided with four hooks 45 (see Fig. 7) engaging loosely the edges and partly the lower side of the frame so as to guide the box and hold it on the frame.

The middle of the frame 37 is preferably formed of a series of parallel iron bars 43, while the end portions are each provided with a large opening 42. The frame 37 is secured upon arms 41 extending from the hangers 34.

At the front end of the box is an eye 46, engaged by a hook rod 47, whose front end connects with a hand lever 48, which is fulcrumed at 49 to the main frame and is within easy reach of the driver when he is on the seat 50.

The bars 29 of the rear carrier are so spaced that all potatoes will drop down between them into the hopper while all vines will be carried on the bars past the hopper and dropped behind the machine.

The frame or support 37 may have a flat sheet metal bottom instead of the bars 43, but as the moist dirt from the potatoes has a great tendency to stick on flat surfaces, I prefer to use bars, and when I use them I provide the partition 51 of the box with a comb-shaped metallic scraper 52 (see Fig. 7) which keeps the bars clean, and if the bottom be flat the scraper is made to fit thereto.

In Figs. 4 and 5 is shown that through the partition 51 and end walls of the box is inserted a rod 53, which is removably held in place by a pin 54, or a pivoted swinging catch 55 may serve the purpose. Said rod is to support bushel baskets 56 in the box, as indicated in dotted lines to the left in Fig. 5. When the rod is not so in service it is carried in two lugs 57, at the outer side of the box, as shown in dotted lines in Fig. 4.

Upon the frame portions 7ˣ is mounted a light rack 58, adapted to carry from one to two dozen bushel baskets 56 placed partly in it and partly hung on hooks like 59 in Fig. 1, about the rack.

In Figs. 1 and 2 is shown that the spout portion of the hopper has a guard 60 hinged at 61, this guard prevents potatoes from flying over the box, while the hinges permit of raising the guard in cleaning the narrow spout which might get more or less obstructed by moist dirt or leaves dropping from the vines passing over the hopper.

In the operation of the machine, the machine is drawn forward with the driver or other person occupying the seat 50, the shovel 8 digs and the front carrier or conveyer 9 conveys the potatoes and the vines to the upper run of the rear carrier or conveyer, which conveys and drops all the vines to the rear of the machine, while all potatoes drop down into the hopper and are thereby guided into such compartment 44 of box 40 as is situated over the bottom or middle portion 43 of the frame 37. When said compartment gets full of potatoes the driver by means of the lever 48 pushes or pulls the box with the empty compartment under the hopper and the full compartment over one of the apertures 42, through which the potatoes are thus deposited in a heap on the ground; when the second compartment is filled the box is pushed or pulled in the opposite direction, so as to refill the first compartment and empty the full compartment through the other aperture 42; the potatoes thus enter the box as indicated at A in Fig. 1 and are dropped as at B, and every other heap at the point C; that is, alternately through the rear and the front apertures 42 in Figs. 3 and 6. In this way the heaps of potatoes and the vines are placed in two separate rows. When the machine takes or digs the next row to the first row, the driver simply watches the first row of heaps he deposited, and pulls the lever at the proper moment to drop the next heap as near as possible to the first heap, and so on with every new operation next to a row previously dug. In this way, when the team and wagon come, it is easy to shovel the potatoes into the wagon, as the heaps are found close together in rows transverse to the movement of the machine. If the soil is very sandy and dry it is often preferred to deposit the potatoes into baskets instead of heaps on the ground. In such cases the rod 53 is put in the position shown in full lines in Fig. 4 and baskets 56 are placed upon the bar in the position they are shown in Fig. 5.

The hook rod may be disengaged from the eye 46 and supported idle on a hook 62 on the frame 7 (see Fig. 1) and one person walking alongside the machine removes the basket from the rack 58 and places it in the empty compartment of the box 40 while a basket in the other compartment is being filled from the hopper. He then pushes the box with the empty basket under the hopper and leaves it there till it gets full; meanwhile he removes the full basket and stands it on the ground, and puts an empty basket from the rack in the place of the full one he removed, and so on until the rack is empty, when he supplies it again with empty baskets previously distributed in heaps on the field. A very great number of baskets is not necessary as one or more teams keep on emptying them into the wagons that haul away the potatoes. In Fig. 2 is shown an angular carrier, 63, sliding in the rack 58 and provided with a hand cord 64 by which the operator while standing near the end of the rack from which he receives the baskets may pull all the baskets toward him and thus reach them all while standing on the ground. When he piles the baskets into the rack again they move the carriage before them to the opposite end of the rack again.

Having thus described my invention, what I claim is:

1. In a potato harvester, the combination with frame work and driving wheels thereof, of a shovel at the front end of the frame for digging the potatoes, means mounted in the frame rearward of the shovel and operatively connected with the driving wheels for separating the potatoes and the vines from the dirt and conveying them upward and rearward, and in the rear of said conveyer an endless carrier operatively connected with the driving wheels and having an upper substantially horizontal run adapted to carry the vines away rearward while the potatoes drop through the run, a hopper mounted below said run and having its lower end directed laterally beyond the lower run of the conveyer so as to drop the potatoes to one side of the machine, and means in the frame for guiding the lower run of the endless vine carrier out of contact with the hopper; a support mounted on the frame work and having below the spout of the hopper a middle portion adapted to support potatoes and near each end an aperture for the potatoes to drop through, a bottomless box slidably mounted on said support and having a partition dividing it into two compartments, a seat on the machine for a driver or other operator, a lever mounted near the seat, and a rod connecting said lever with the box, whereby the operator may while occupying the seat move the box with either of its compartments alternately over the middle portion of the support or over one of the apertures, for the purposes set forth.

2. In a potato harvester, the combination with frame work and driving wheels thereof, of a shovel at the front end of the frame for digging the potatoes, means mounted in the frame rearward of the shovel and operatively connected with the driving wheels for separating the potatoes and the vines from the dirt and conveying them upward and rearward, and in the rear of said conveyer an endless carrier operatively connected with the driving wheels and having an upper substantially horizontal run adapted to carry the vines away rearward while the potatoes drop through the run, a hopper mounted below said run and having its lower end directed laterally beyond the lower run of the conveyer so as to drop the potatoes to one side of the machine, and means in the frame for guiding the lower run of the endless vine carrier out of contact with the hopper; a support mounted on the frame work and having below the spout of the hopper a middle portion adapted to support potatoes, and near each end an aperture for the potatoes to drop through, a bottomless box slidably mounted on said support and having a partition dividing it into two compartments, a seat on the machine for a driver or other operator, a lever mounted near the seat, and a rod connecting said lever with the box, whereby the operator may while occupying the seat move the box with either of its compartments alternately over the middle portion of the support or over one of the apertures, for the purposes set forth; said middle portion of the support being of metal and the partition in the box carrying a metal scraper for cleaning said middle portion.

3. In a potato harvester, the combination with frame work and driving wheels thereof, of a shovel at the front end of the frame for digging the potatoes, means mounted in the frame rearward of the shovel and operatively connected with the driving wheels for separating the potatoes and the vines from the dirt and conveying them upward and rearward, and in the rear of said conveyer an endless carrier operatively connected with the driving wheels and having an upper substantially horizontal run adapted to carry the vines away rearward while the potatoes drop through the run, a hopper mounted below said run and having its lower end directed laterally beyond the lower run of the conveyer so as to drop the potatoes to one side of the machine, and means in the frame for guiding the lower run of the endless vine carrier out of contact with the hopper; a support mounted on the frame work and having below the spout of the hopper a middle portion adapted to support potatoes and near each end an aperture for the potatoes to drop through, a bottomless box slidably mounted on said support and having a partition dividing it into two compartments, a seat on the machine for a driver or other operator, a lever mounted near the seat, and a rod connecting said lever with the box, whereby the operator may while occupying the seat move the box with either of its compartments alternately over the middle portion of the support or over one of the apertures, said middle portion of the support being formed of parallel metal bars slightly spaced apart, and the partition in the box having at its lower edge a metallic scraper fitting upon and between the bars, for the purpose set forth.

4. In a potato harvester, the combination with a frame work and driving wheels thereof, of a shovel at the front end of the frame for digging the potatoes, means mounted in the frame rearward of the shovel and operatively connected with the driving wheels for separating the potatoes and the vines from the dirt, conveying them upward and rearward, and in the rear of said conveyer an endless carrier operatively connected with the driving wheels and having an upper substantially horizontal run adapted to carry the vines away rearward while the potatoes drop through the run, a hopper mounted below said run and having its lower end directed laterally beyond the lower run of the conveyer so as to drop the potatoes to one side of the machine, and means in the frame for guiding the lower run of the endless vine carrier out of contact with the hopper; said hopper having at the outer side of its spout a hinged portion for the purposes set forth.

In testimony whereof I affix my signature, in presence of two witnesses.

GEO. W. BRUCE.

Witnesses:
A. M. CARLSEN,
R. E. CARLSEN.

Copies of this patent may be obtained for five cents each, by addressing the "Commissioner of Patents, Washington, D. C."